United States Patent [19]

Hill

[11] 4,030,775
[45] June 21, 1977

[54] APPARATUS FOR ALIGNING HITCHES OF TOWING AND TOWED VEHICLES

[75] Inventor: John C. Hill, Carmichael, Calif.

[73] Assignee: Pro-Tec Industries, La Habra, Calif.

[22] Filed: Jan. 2, 1976

[21] Appl. No.: 646,187

[52] U.S. Cl. .............................. 280/477; 340/52 R; 340/282

[51] Int. Cl.² ............................................ B60D 1/14

[58] Field of Search ......... 280/477; 340/52 R, 282, 340/275

[56] References Cited
UNITED STATES PATENTS

| 3,731,274 | 5/1973 | Green | 340/52 R |
|---|---|---|---|
| 3,734,539 | 5/1973 | Salmi | 280/477 |
| 3,858,966 | 1/1975 | Lowell | 280/477 X |

FOREIGN PATENTS OR APPLICATIONS

| 529,547 | 6/1955 | Italy | 280/477 |

*Primary Examiner*—Joseph F. Peters, Jr.
*Assistant Examiner*—John A. Pekar
*Attorney, Agent, or Firm*—Francis X. Lo Jacono

[57] ABSTRACT

The apparatus has a flat, flexible concave/convex tape retractably coiled into a spool having a housing which is mounted on a suitable gimble. The gimble is fixedly mounted on the towing vehicle so that the spool axis is horizontal. A suitable eyelet is provided on the end of the tape so that the eyelet is substantially above the ball hitch when the tape is fully retracted. On the towed vehicle, a vertical rod is disposed aligned above the ball socket and the rod is adapted to receive the eyelet. The gimble allows the spool to rotate about a vertical axis and also allows the spool housing to pivot about another horizontal axis spaced above the spool's axis. A micro-switch is provided which responds to tape tension when tape is withdrawn from housing, and a potentiometer is provided which relays responses to horizontal rotation of the housing. A display, in the form of a meter, is provided in sight of the operator of the towing vehicle, which meter measures the potentiometer setting and a display in the form of an indicator light is provided which responds to the micro-switch to indicate when the tape is fully retracted or withdrawn, i.e., off when retracted, on when withdrawn.

6 Claims, 4 Drawing Figures

U.S. Patent  June 21, 1977  4,030,775
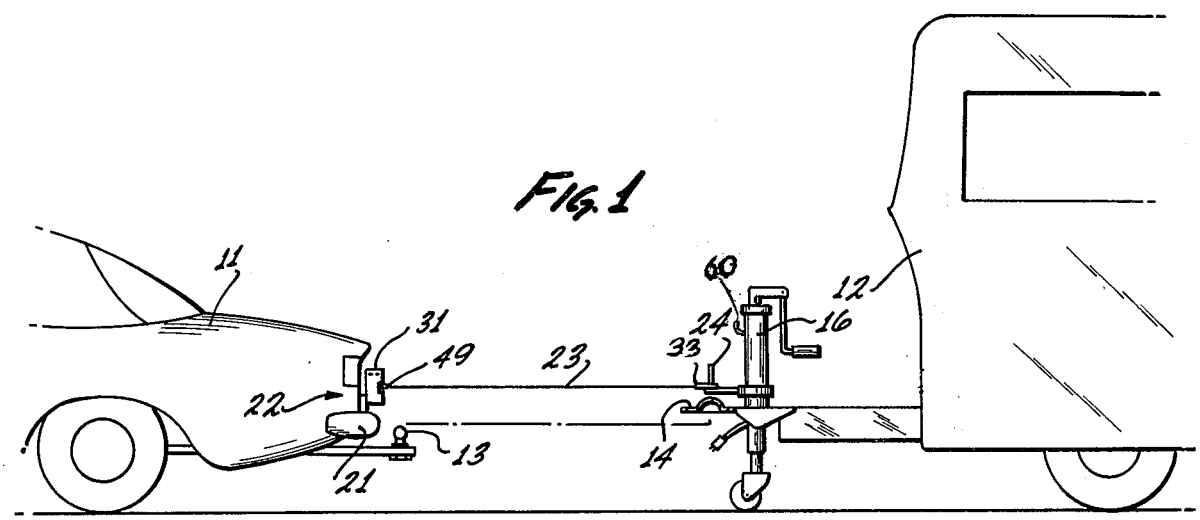
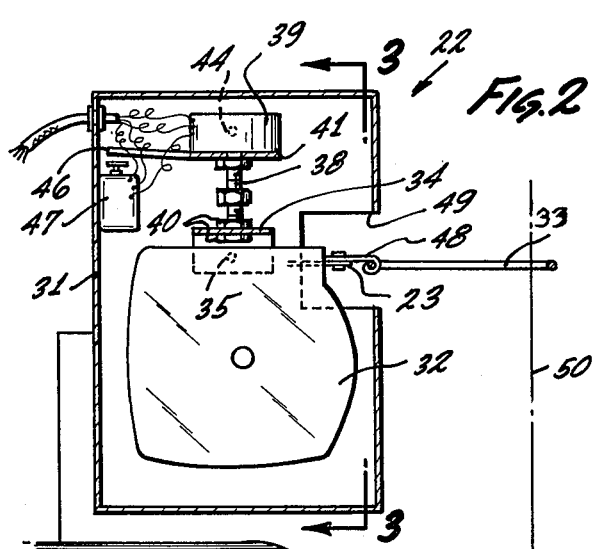
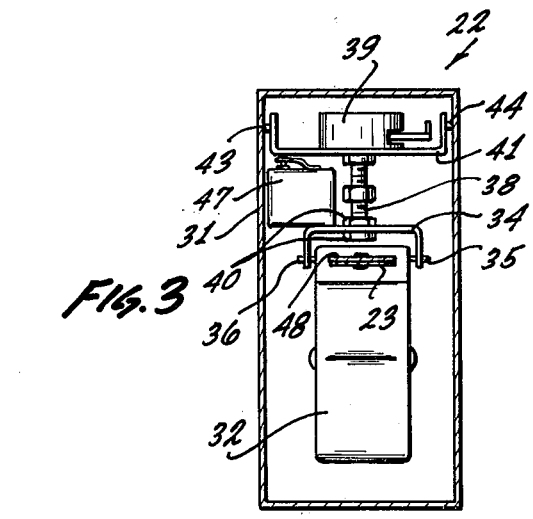
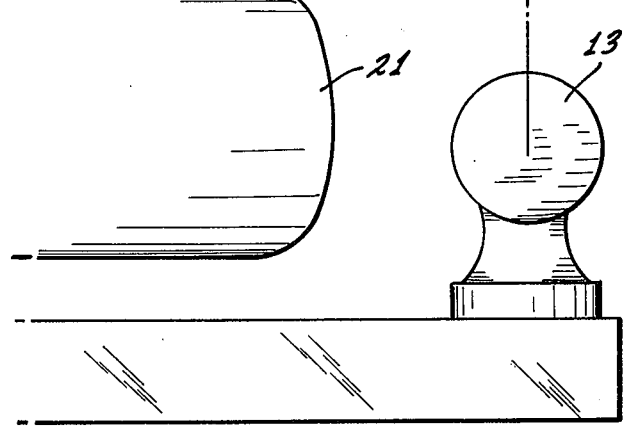
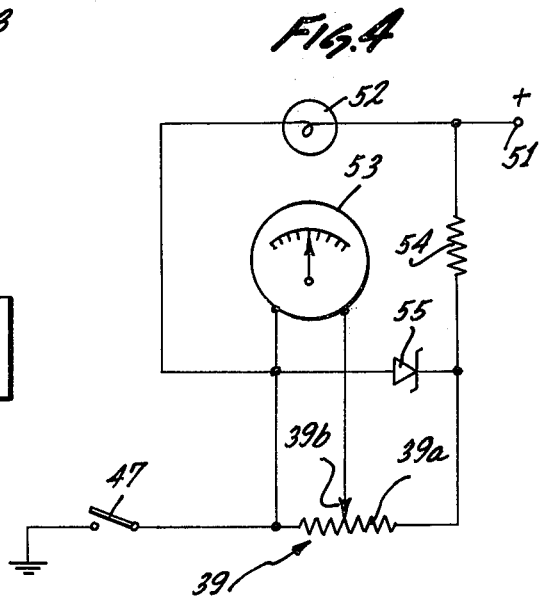

APPARATUS FOR ALIGNING HITCHES OF TOWING AND TOWED VEHICLES

FIELD OF THE INVENTION

The present invention relates generally to the field of automotive and trailer accessories and, more particularly, to a simplified apparatus for aiding a driver to align his ball hitch with the socket of a trailer for easy coupling.

BACKGROUND OF THE INVENTION

One problem that has long faced the owners of recreational vehicles such as house trailers, boats, etc., has been the difficulty in hitching and re-hitching the trailer to the family automobile or tow vehicle. The difficulty is due to the fact that the trailers are heavy and large, whereby a person cannot readily move them around. Therefore, the family auto must be moved to the trailer because, obviously, the auto has the engine. However, the auto must be backed to the trailer and the driver has no way of observing when the two mating hitches are aligned. Another person is required to direct the driver. In the past, devices have been patented to help the driver align the hitches without the need of a helper. These prior art devices are complicated and relatively large and expensive. Also, once the trailer is hitched to the auto, these prior art devices cannot be adapted to indicate to the driver the relative angle the trailer makes with the auto, which is useful, for example, when one is backing the trailer.

OBJECTS OF THE INVENTION

An object of this invention is to provide a simple, dependable apparatus for aligning hitches of towing and towed vehicles.

Another object of this invention is to provide an apparatus that can perform the above object and can be converted to indicate the relative angle between the towing and towed vehicles, to prevent jack-knifing when one attempts to back up.

Another object of this invention is to provide a housing for a spool with a retractable tape mounted on the towing vehicle, which spool is gimbled about horizontal and vertical axes within the housing, with indications to denote horizontal rotation.

These and other objects and features of advantage will become more apparent after studying the following description of the preferred embodiment of my invention, together with the appended drawing.

BRIEF DESCRIPTION OF THE DRAWINGS

FIG. 1 is a schematic elevation of an auto and trailer in the unhitched position, with my novel apparatus mounted on the auto, and the tape pulled out to make contact with the trailer.

FIG. 2 is an enlarged schematic elevation of the apparatus mounted on the auto, with the housing shown in section.

FIG. 3 is a view taken on line 3—3 of FIG. 2.

FIG. 4 is a schematic of the electrical circuit.

DETAILED DESCRIPTION OF THE DRAWING

Referring to FIG. 1, there is shown the rear end of an auto or car 11 and the front end of a trailer 12. The auto 11 has, for example, a standard ball hitch 13, suitably mounted thereto, and the trailer 12 has, for example, a standard socket 14 also suitably mounted thereto. In addition, the trailer has a standard forward jack 16 which is used to level the trailer when it is made stationary and unhitched from the auto. The jack 16 is usually disposed between the socket 14 and the body of the trailer, as shown. The auto is shown with a standard bumper 21, having mounted thereon my novel apparatus 22. The apparatus has a steel tape 23 retractably mounted therein. In FIG. 1, the steel tape is shown coupled to a rod 24 mounted on the trailer and, more particularly, on jack 16 so that the rod 24 has a vertical portion disposed substantially above the socket 14, for reasons that will become apparent hereinafter.

Referring to FIGS. 2 and 3, the apparatus 22 is shown in greater detail. The apparatus has a box-like housing 31 which is suitably mounted on the bumper 21. One must remember that the housing 31 need not necessarily be mounted on bumpers. All that is required is that the housing be affixed to auto 11 relatively near the ball hitch 13 and substantially on the center line of the auto because the ball hitch is on the center line, as will become apparent hereinafter. Within the housing is supported a spool body 32 which contains the retractable tape 23. The spool body 32 and tape 23 are substantially similar to a steel tape rule, as used by carpenters. The spool body is suspended from a yoke 34 by aligned pins 35 and 36 so that the spool body 32 may pivot about these pins 35 and 36. Fixed to the yoke 34 is mounted a shaft 38 of a standard potentiometer 39 by means of nuts 40. The body of the potentiometer 39 is suitably fixed to another yoke 41, so that the shaft 38 and yoke 34 are free to rotate with respect to the body of the potentiometer 39 and the yoke 41. In turn, yoke 41 is free to pivot about a pair of aligned pins 43 and 44. The yoke 41 has a finger 46 (FIG. 2) made integral therewith, and this finger 46 is disposed to make contact with a suitable switch 47 in a manner to be described hereinafter. As mentioned before, tape 23 has an eyelet 33 coupled to its end. This eyelet 33 is suitably mounted by a pad 48 to the tape. Both the tape 23 and eyelet 33 are disposed to protrude through an opening 49 formed in the housing 31. In FIG. 2 the tape 23 is shown fully withdrawn within the spool body 32, whereby the pad 48 bears thereagainst. The eyelet 33 is made of a length such that its end is substantially aligned over the vertical center line 50 of the ball hitch 13. In this position, the spool body 32 hangs freely whereby the finger 46 is spaced slightly above the switch 47, as more clearly shown in FIG. 2.

In operation, one need only to back up the auto 11 so that the ball hitch 13 is about 10 feet away from the socket 14, providing the length of tape 23 is at least that much. If the tape 23 is longer, then one need not back the auto that close, and if the tape is shorter, then one needs to back the auto closer. The only requirement is that the distance between the ball hitch 13 and socket 14 is less than the length of the tape 23. The driver now sets the brake, gets out of the car, pulls on eyelet 33 to extend the tape 23 out of the spool body, and couples the eyelet to the rod 24 such as shown in FIG. 1. One advantage of this system is that the auto and trailer need not be aligned, since the spool 32 is free to pivot about a vertical axis defined by shaft 38. Opening 49 extends around the housing 31 to allow one to use the apparatus when the auto and trailer are at a large angle to each other, for example 30°. Since the tape is extended, the yoke 41 pivots about pins 43 and 44 so that the finger 46 contacts switch 47 to close a circuit.

Referring to FIG. 4 wherein a schematic of the electrical circuit is shown, switch 47 at the bottom left is now closed completing the circuit from a terminal 51, through a lamp 52 and ground. The lamp 52, being inside the auto, for example on or near the dashboard, can be seen glowing by the driver to tell him that the auto and trailer are not in position for coupling. The potentiometer 39 is represented by a resistor 39a and wiper 39b. The wiper 39b is attached to the shaft 38, while the resistor 39a is stationary like the potentiometer body. When the switch 47 closes, a potential drop is also formed across resistor 39a. Therefore, a meter 53, also located on the dashboard, could indicate the relative angle the spool body 32 makes with respect to the housing 31. Of course, the meter is connected so that full deflection is obtained when the spool is rotated fully, for example, clockwise, and no deflection is obtained when the spool is rotated fully counter-clockwise. When the spool and housing are aligned, the meter pointer is at midpoint. One will note that another resistor 54 is placed in series with the potentiometer resistor 39a to form a voltage divider circuit. Also a Zener diode 55 is connected in series with the resistor 39a. The Zener diode insures that the voltage drops across the resistor 39a is constant for all battery voltage values and resistor 54 is a current limiting resistor. The voltage drop across one end of the resister 39a to wiper 39b allows the driver, as he backs up, to determine how much to turn the steering wheel to bring the needle back to midpoint without oversteering.

Now, with the apparatus coupled, as described, the driver of the auto backs up slowly and if the pointer moves to one side of the middle, he turns his steering wheel so that the pointer is returned to midpoint. This allows him to back up the auto on a straight line directly to the socket 14. One should remember that this straight line need not coincide with the center line of the trailer. When the ball 13 is directly under the socket 14, the rod 24 being directly over the ball 13, the tape is fully retracted. This causes the lamp 52 to go out, since switch 47 will now be opened by the yoke 41 pivoting to raise the finger 46 off the switch. Since the auto is moving slowly, the auto can be stopped short by applying the brakes. The driver now exits the auto, removes the eyelet from the rod 24, lowers the socket 14 in place around the ball 13, by operating the jack 16.

As an alternative, one could place a pair of switches so that they are actuated by the rotation of shaft 38, so that one switch closes when the shaft rotates one way off center, and the other switch remains open, and so that the other switch closes when the shaft rotates the other way off center and the one switch opens. When the spool 32 is aligned in the housing 31, this position would be indicated by either two lamps glowing, or by two lamps out. Of course, lamp 52 would still be used to indicate when the tape is fully retracted. This embodiment would not be as useful as the illustrated embodiment because the driver would not know the amplitude of the misalignment.

In addition, the apparatus, as mentioned above, would be useful to indicate the angle between the auto and trailer after they are hitched together. This can be done by placing the eyelet 33 on a hook 60 (FIG. 1) fixed to the jack 16 behind the socket 14. This position would be useful as a guide to the driver in backing the trailer, because the meter would indicate to him when the two vehicles are about to jack-knife.

Having described the preferred embodiment of my invention, one skilled in the art, after studying the above description, could devise other embodiments without departing from the spirit and scope of my invention. Therefore my invention is not to be considered as limited to the described embodiments, but includes all embodiments falling within the scope of the appended claims.

I claim:

1. In a tow car, having on its rear end a first coupling unit connectable to a complementary second coupling unit on the front end of a trailer, apparatus on the tow car operable to signal to the tow car driver in order to guide him while backing up the tow car to bring its coupling unit into position to hook up to the trailer's coupling unit, said apparatus comprising:
   a housing mounted on said tow car;
   a spool body;
   first means for mounting within said housing said spool body to pivot about a horizontal and a vertical axis;
   a flexible member retractably wound within said spool body;
   a second means formed on the end of said flexible member;
   a third means mounted on said trailer and adapted to be coupled to said second means;
   fourth means mounted on said first means to indicate when said spool pivots about said vertical axis; and
   fifth means mounted on said housing adjacent said first means to indicate when said flexible member is fully retracted within said spool body; wherein:
   said first means comprises a first U-shaped yoke having a spool body pin mounted within said first yoke;
   said fourth means comprises a potentiometer having a body and a rotatable shaft therein;
   said rotatable shaft fixedly mounted to said first yoke substantially at the center thereof so that said first yoke and said spool body depend therefrom.

2. In the apparatus of claim 1 wherein said fifth means comprises:
   a second U-shaped yoke having said potentiometer body mounted substantially at the center thereof;
   a pin for mounting said second yoke to said housing by the ends of said second yoke so that said second yoke pivotably depends from said pin;
   an electric switch mounted on said housing; and
   said second yoke having a finger disposed to make contact with said switch whenever said second yoke pivots.

3. In the apparatus of claim 2 wherein:
   said second means is disposed vertically aligned with said first coupling unit whenever said flexible member is retracted fully into said spool body; and
   said third means is disposed vertically aligned with said second coupling unit.

4. In the apparatus of claim 3 wherein said flexible member is made of a flat tape.

5. In the apparatus of claim 4 wherein a coupling hook is disposed on said trailer aft of said second coupling unit so that said second means can be coupled thereto and said apparatus indicates the relative angle between said tow car and said trailer.

6. In the apparatus of claim 2 wherein:
   said second means is disposed vertically aligned with said first coupling unit whenever said flexible member is retracted fully into said spool body; and
   said third means is disposed vertically aligned with said second coupling unit.

* * * * *